Sept. 6, 1949. H. P. CULP 2,481,472
PACKLESS EXPANSION JOINT
Filed Feb. 3, 1948 2 Sheets-Sheet 1

INVENTOR
Herbert P. Culp
BY
Bean, Brooks, Buckley & Bean.
ATTORNEYS

Sept. 6, 1949.  H. P. CULP  2,481,472
PACKLESS EXPANSION JOINT
Filed Feb. 3, 1948  2 Sheets-Sheet 2

INVENTOR.
Herbert P. Culp
BY
Bean, Brooks, Buckley & Bean.
ATTORNEYS

Patented Sept. 6, 1949

2,481,472

UNITED STATES PATENT OFFICE 2,481,472

PACKLESS EXPANSION JOINT

Herbert P. Culp, Williamsville, N. Y., assignor to American District Steam Company, North Tonawanda, N. Y.

Application February 3, 1948, Serial No. 6,099

10 Claims. (Cl. 285—162)

This invention relates to expansion joints for use in fluid conduits subject to expansion and contraction due to variations in temperature.

The present invention relates particularly to packless expansion joints wherein the usual soft packing materials are entirely absent and the flexibility of the joint is secured by the use of flexible diaphragms. Joints of this general nature are known in the art but generally comprise various bolted circular sections which clamp the diaphragms to seal the latter.

According to the present invention, the several diaphragms are interconnected in a novel manner so that they provide a fluid seal independently of the usual housing elements. In the joint of the present invention housing elements are present but serve merely to reinforce and back up the independently sealed diaphragm units.

In the expansion joint of the present invention the various diaphragm units are interconnected entirely by welding, the reinforcing and protecting housing elements being bound over the completely sealed and assembled diaphragm units after the welded diaphragm assemblies are complete. The foregoing construction gives many advantages in fabrication, in assembly, and in service and maintenance.

A further advantage of the joint of the present invention resides in the provision of novel means which lie directly against the several diaphragms to prevent undue deformation thereof. Other objects and advantages of the invention will appear to those skilled in the present art from a consideration of the specific embodiment of my invention which is set forth in the accompanying drawings and the following detailed description as an example of the principles of my invention. However, it is to be understood that the embodiment shown and described herein is merely to illustrate the principles of the invention and various modifications may be made without departing from the spirit of the invention which is limited only as defined in the appended claims.

Figure 1:
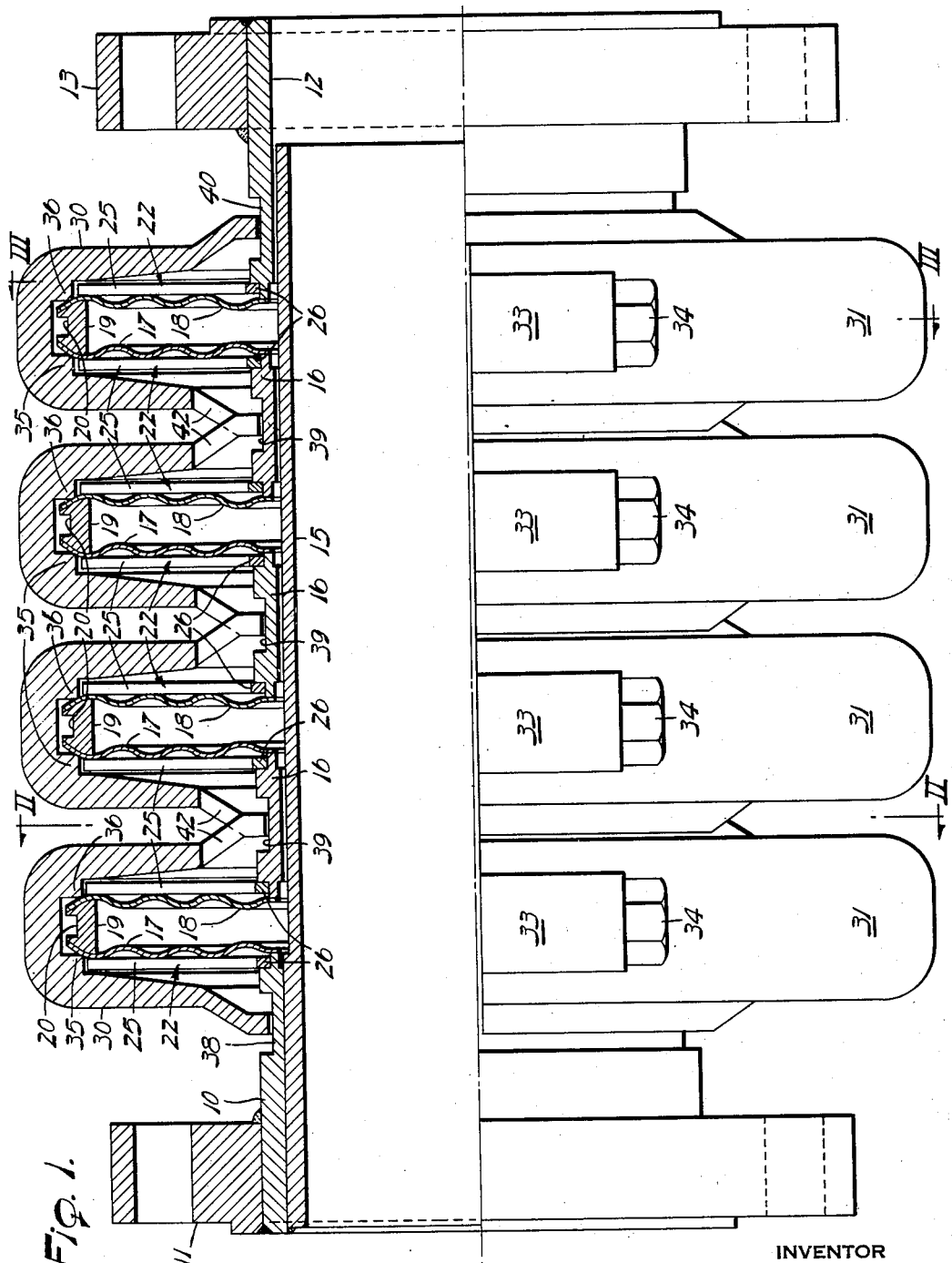
Fig. 1 is a longitudinal view of one form of the expansion joint of the present invention, particularly in cross section.

In the several figures of the drawings like characters of reference denote like parts and the numeral 10 designates a pipe stud having a flange 11 welded thereto to constitute a connecting member for connection with a length of pipe (not shown). The numeral 12 designates a second pipe stud, likewise having a flange 13 welded thereto to comprise a connecting member for connection with a second length of coaxial pipe (not shown). A pipe section 15 is welded within stud 10 and extends telescopically into the other pipe stud 12, but is freely slidable in the latter. The length of pipe 15 is such that it extends freely within pipe stud 12 even when the joint has expanded its maximum amount. This prevents scale or other impurities which may be present in the pipe line from getting into the diaphragm portion of the expansion joint.

The pipe section 15 serves as a sliding support for rings 16 which, in the present instance, are three in number. However, only one ring 16 may be employed, or any other number depending on the desired expansion capacity of the joint. It will be noted that the inner edges of the pipe studs 10 and 12 and the opposite marginal edges of the several rings 16 are of reduced thickness and have welded thereto the inner marginal edges of a series of annular corrugated diaphragms, each pair of which is designated 17 and 18.

Outer rings 19 are provided and each pair of diaphragms 17 and 18 has its outer marginal edges welded to one of the rings 19. It will be noted that each of the rings 19 has an outer peripheral groove 20 so that the outer edge of each diaphragm is welded to a relatively thin flange at the outer periphery of ring 19 at each side. This minimizes the problem which presents itself in welding when a relatively thin sheet is to be welded to a part of much greater thickness.

The structure thus far described completes the expansion joint proper, apart from further backing and reinforcement and protection of the relatively thin diaphragms 17 and 18. If the structure of Fig. 1 thus far described were subject to a compressive force due to expansion of the pipes with which they connect, the inner edges of each pair of diaphragms would move toward each other in amounts divided substantially equally over the several pairs of diaphragms. If the joint were to be expanded from the position shown by reason of contraction of pipe with which the joint connects, the inner edges of each pair of diaphragms would move apart, this movement again being distributed substantially equally across the four pairs of diaphragms shown in the particular instance illustrated herein.

At its outer face each diaphragm has a backing ring 22 which is of generally circular form and slotted radially inwardly from its outer periphery to such depth as to provide a plurality of segments or plate portions 25 extending radially outwardly from a common supporting ring portion 26. The latter seats against a shoulder which results from the thinning of the inner edge of each of the pipe studs 10 and 12 and the opposite ends of each of the rings 16, as appears clearly in Fig. 1. The backing rings 22 are of sufficiently resilient material and so formed that the several plate portions 25 of each backing ring bear flexibly against the outer face of the adjacent corrugated diaphragm to reinforce it and cause it to yield uniformly under influences of expansion and contraction.

The degree of flexure of plate portions 25 and consequently the ultimate degree of expansion of the diaphragm assemblies is limited by an outer casing structure which will now be described in detail. Speaking generally, each pair of associated diaphragms is encased by an individual casing structure comprising a pair of more or less semi-circular elements which are bolted about each diaphragm assembly.

Figure 3:
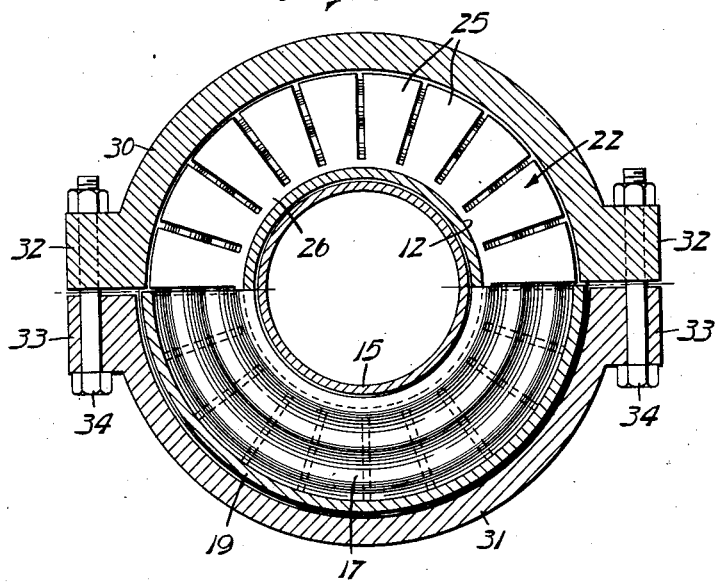
Fig. 3 is a transverse cross sectional view on the line 3—3 of Fig. 1.

Referring particularly to Fig. 3, the outer casing for each pair of diaphragms 17 and 18 comprises a pair of semi-circular casing elements 30 and 31 having lateral flanges 32 and 33, respectively, for receiving bolt and nut fasteners 34. The casing elements 30 and 31 are of inwardly-facing channel cross section and have interior ledges, as at 35 and 36 in Fig. 1. It will be noted that flanges 32 and 33 do not abut and the ledges 35 and 36 clamp against the outer margins of the diaphragms 17 and 18 and press them against ring 19.

Thus fluid pressures developed within the chamber formed by each pair of diaphragms are resisted by the pressure of ledges 35 and 36 and no stress is put on the welded joints which connect the outer margins of the several pairs of diaphragms to the rings 19. At the inner margins of diaphragms 17 and 18, where they are welded to studs 10 and 12 and rings 16, pressure between the diaphragms urges them more firmly against the elements to which they are welded, again relieving the welded joints of possibly disruptive stress.

As viewed in Fig. 1, the axially spaced inner edges of the left-hand casing elements 30 and 31 seat in a peripheral groove 38 formed in pipe stud 10 and a groove 39 formed in the periphery of ring 16. The axially spaced inner edges of the two intermediate casing elements 30 and 31 seat in grooves 39 formed in the several rings 16, and the inner edges of the right-hand pair of casing elements 30 and 31 seat in groove 39 of right-hand ring 16 and a peripheral groove 40 formed in pipe stud 12. The widths of the several grooves 38, 39 and 40 in the direction of the axis of the joint define and establish the maximum expansion and contraction of the joint by engagement of the inner edges of the several casing elements against one side or the other of each of the several grooves.

Figure 2:
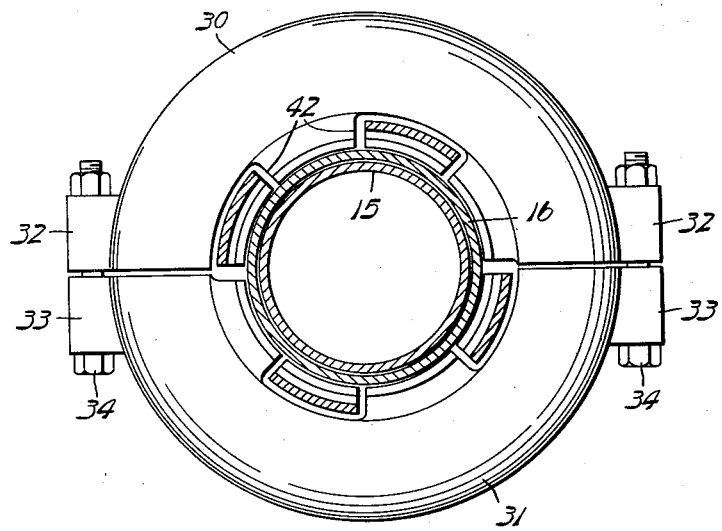
Fig. 2 is a transverse cross sectional view thereof on the line 2—2 of Fig. 1.

For reasons of compactness of design the two intermediate pairs of casing elements 30 and 31 and the adjacent sides of the end casing elements 30 and 31 are provided with notches in their inner edges as indicated at 42 in Figs. 1 and 2. The notches 42 are staggered so that the inner edges of the casing elements may interfit in a manner clearly illustrated in Figs. 1 and 2, with the result that, when the joint is fully contracted, as determined by the location of the side edges of the grooves 38, 39 and 40, the side walls of adjacent pairs of casing elements 30 and 31 will be practically touching. In fact, they may engage against each other to thus determine the minimum length of the joint independently of the grooves 38, 39 and 40. The latter are essential, however, in any event, to determine the maximum expanded length of the joint.

The illustrated embodiment includes four pairs of diaphragms 17 and 18, but it is to be understood that this number may be varied at will, depending generally on the expansion capacity desired. Where only one pair of diaphragms 17 and 18 are employed they will be secured one to each of the pair of pipe studs 10 and 12 and there will accordingly be no necessity for the intermediate rings 16 nor for the notches 42 in the casing elements 30 and 31.

What is claimed is:

1. In an expansion joint, a ring member, a pair of circular diaphragms secured at their outer margins to opposite sides of said ring member, a pair of spaced tubular members, said diaphragms having central openings and being secured at the margins of said openings to the facing ends of said tubular members, and an outer casing comprising a pair of semi-circular members adapted to be secured about said ring member in clamping relation and having spaced inwardly extending flanges for encasing said diaphragms, said tubular members having external peripheral grooves receiving the inner edges of said flanges and thus limiting the degree of relative axial movement between said casing and each of said tubular members.

2. In an expansion joint, a ring member, a pair of circular diaphragms secured at their outer margins to opposite sides of said ring member, a pair of spaced tubular members, said diaphragms having central openings and being secured at the margins of said openings to the facing ends of said tubular members, and an outer casing comprising a pair of semi-circular members adapted to be secured about said ring member in clamping relation.

3. In an expansion joint, a ring member, a pair of circular diaphragms secured at their outer margins to opposite sides of said ring member, a pair of spaced tubular members, said diaphragms having central openings and being secured at the margins of said openings to the facing ends of said tubular members, and an outer casing comprising a pair of semi-circular members adapted to be secured about the assembled diaphragms and ring member and having spaced inwardly extending flanges for encasing said diaphragms, said tubular members having external peripheral grooves receiving the inner edges of said flanges and thus limiting the degree of relative axial movement between said casing and each of said tubular members.

4. In an expansion joint, a ring member, a pair of circular diaphragms secured at their outer margins to opposite sides of said ring member, a pair of spaced tubular members, said diaphragms having central openings and being secured at the margins of said openings to the facing ends of said tubular members, a spring disc mounted on each of said tubular members and lying against the outer face of each diaphragm to reinforce the same, and an outer casing comprising a pair of semi-circular members adapted to be secured about said ring member in clamping relation and having spaced inwardly extending flanges for encasing said diaphragms.

5. In an expansion joint, a ring member, a pair of circular diaphragms secured at their outer margins to opposite sides of said ring member, a pair of spaced tubular members, said diaphragms having central openings and being secured at the margins of said openings to the facing ends of said tubular members, an annular plate mounted on each of said tubular members and having a plurality of slots in its periphery to form a series of radiating spring fingers lying against the outer face of each diaphragm to reinforce the same, and an outer casing comprising a pair of semi-circular members adapted to be secured about said ring member in clamping relation and having spaced inwardly extending flanges for encasing said diaphragms.

6. In an expansion joint, a pair of pipe studs, a pipe section secured to one of said pipe studs and telescoping within the other, a ring extending about the pipe section and movable axially thereon, a diaphragm having a central opening secured to the inner end of one of said pipe studs, a second diaphragm having a central opening secured to the adjacent end of said ring, and an outer relatively rigid ring between said diaphragms, the outer margins of said two diaphragms being secured thereto, a second pair of diaphragms similarly connected to the other pipe stud and the other end of said ring, and an outer relatively rigid ring fixed between their outer margins, and a pair of rigid semi-circular outer casing elements adapted to be secured about each of said relatively rigid outer rings in clamping relation.

7. In an expansion joint, a pair of pipe studs, a pipe selection secured to one of said pipe studs and telescoping within the other, a ring extending about the pipe section and movable axially thereon, a diaphragm having a central opening secured to the inner end of one of said pipe studs, a second diaphragm having a central opening secured to the adjacent end of said ring, and an outer relatively rigid ring between said diaphragms, the outer margins of said two diaphragms being secured thereto, a second pair of diaphragms similarly connected to the other pipe stud and the other end of said ring, and an outer relatively rigid ring fixed between their outer margins, and a pair of rigid semi-circular outer casing elements adapted to be secured about each of said relatively rigid outer rings in clamping relation and having spaced inwardly extending flanges for encasing the pair of diaphragms secured thereto.

8. In an expansion joint, a pair of pipe studs, a pipe section secured to one of said pipe studs and telescoping within the other, a ring extending about the pipe section and movable axially thereon, a diaphragm having a central opening secured to the inner end of one of said pipe studs, a second diaphragm having a central opening secured to the adjacent end of said ring, and an outer relatively rigid ring between said diaphragms, the outer margins of said two diaphragms being secured thereto, a second pair of diaphragms similarly connected to the other pipe stud and the other end of said ring, and an outer relatively rigid ring fixed between their outer margins, and a pair of rigid semi-circular outer casing elements adapted to be secured about each of said relatively rigid outer rings in clamping relation and having spaced inwardly extending flaring flanges for encasing the pair of diaphragms secured thereto, the adjacent flaring flanges of the two pairs of casing elements having staggered notches in their inner edges whereby they freely interfit and permit maximum contraction of the joint.

9. In an expansion joint, a pair of pipe studs, a pipe section secured to one of said pipe studs and telescoping within the other, a ring extending about the pipe section and movable axially thereon, a diaphragm having a central opening secured to the inner end of one of said pipe studs, a second diaphragm having a central opening secured to the adjacent end of said ring, and an outer relatively rigid ring between said diaphragms, the outer margins of said two diaphragms being secured thereto, a second pair of diaphragms similarly connected to the other pipe stud and the other end of said ring, and an outer relatively rigid ring fixed between their outer margins, and a pair of rigid semi-circular outer casing elements adapted to be secured about each of said relatively rigid outer rings in clamping relation, said first-mentioned ring and said pipe studs having external peripheral grooves, said casing elements having spaced inwardly extending flanges for encasing the diaphragms, the inner edges of said flanges extending into said peripheral grooves to limit the degree of relative axial movement between said casing elements and said pipe studs and said first-mentioned ring.

10. In an expansion joint, a pair of pipe studs, a pipe section secured to one of said pipe studs and telescoping within the other, a ring extending about the pipe section and movable axially thereon, a diaphragm having a central opening secured to the inner end of one of said pipe studs, a second diaphragm having a central opening secured to the adjacent end of said ring, and an outer relatively rigid ring between said diaphragms, the outer margins of said two diaphragms being secured thereto, a second pair of diaphragms similarly connected to the other pipe stud and the other end of said ring, and an outer relatively rigid ring fixed between their outer margins, and a pair of rigid semi-circular outer casing elements adapted to be secured about each of said relatively rigid outer rings in clamping relation, said first-mentioned ring and said pipe studs having external peripheral grooves, said casing elements having spaced inwardly extending flaring flanges for encasing the diaphragms, the inner edges of said flanges extending into said peripheral grooves to limit the degree of relative axial movement between said casing elements and said pipe studs and said first-mentioned ring, the adjacent flaring flanges of the two pairs of casing elements having staggered notches in their inner edges whereby they freely interfit and both engage in the groove in said first-mentioned ring member for free and independent axial movement.

HERBERT P. CULP.

REFERENCES CITED

The following references are of record in the file of this patent:

UNITED STATES PATENTS

| Number | Name | Date |
| --- | --- | --- |
| 1,835,298 | Greene | Dec. 8, 1931 |
| 2,207,146 | Fentress | July 9, 1940 |